W. C. CARR.
CONTROLLING MECHANISM FOR MOTOR TRUCKS.
APPLICATION FILED DEC. 31, 1919.
1,368,892.
Patented Feb. 15, 1921.
2 SHEETS—SHEET 1.
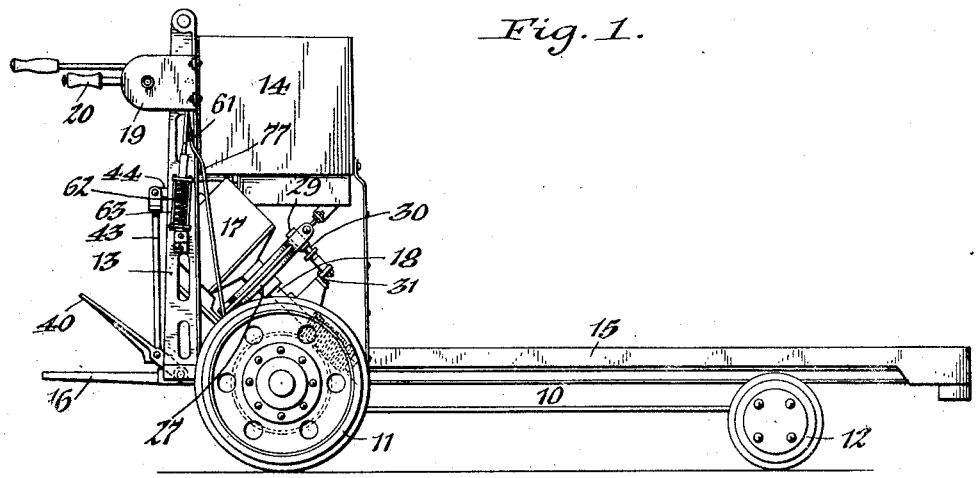
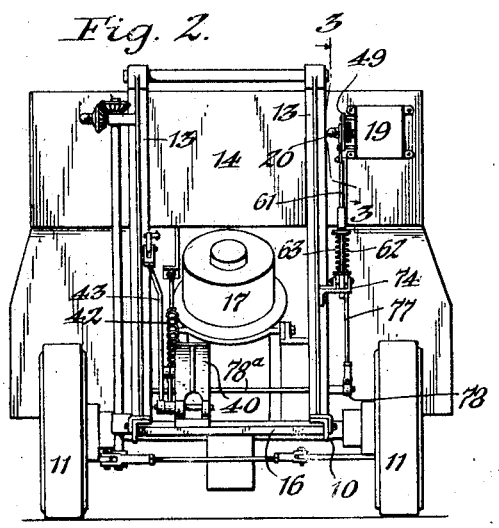
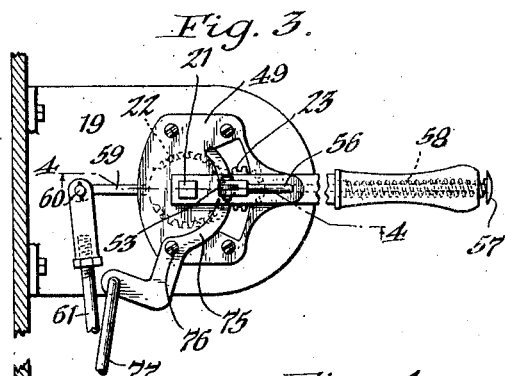
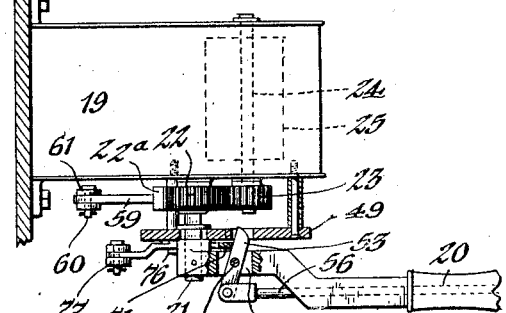
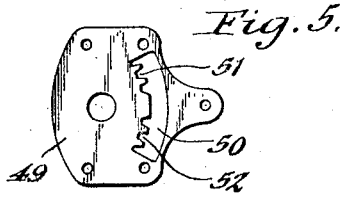
Inventor,
William C. Carr,
by Geyer Popp
Attorneys.

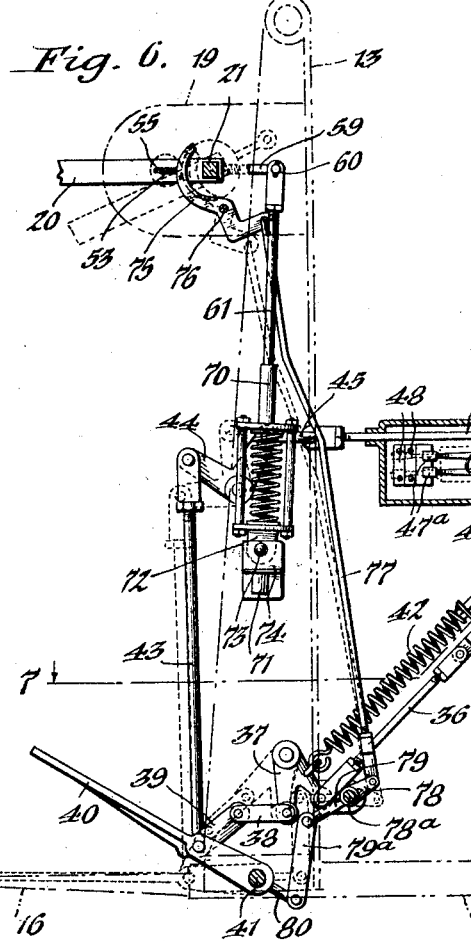

UNITED STATES PATENT OFFICE.

WILLIAM C. CARR, OF BUFFALO, NEW YORK.

CONTROLLING MECHANISM FOR MOTOR-TRUCKS.

1,368,892. Specification of Letters Patent. Patented Feb. 15, 1921.

Application filed December 31, 1919. Serial No. 348,593.

*To all whom it may concern:*

Be it known that I, WILLIAM C. CARR, a citizen of the United States, residing at Buffalo, in the county of Erie and State of New York, have invented new and useful Improvements in Controlling Mechanism for Motor-Trucks, of which the following is a specification.

This invention relates to the controlling means of motor trucks and particularly trucks of the type which are adapted for use in inter-plant transportation, railway stations and other places where large quantities of mixed freight and material are handled, and where safety of operation and control is essential.

In the motor circuit of such trucks there is usually a main switch which establishes the circuit when the brake is released and breaks the circuit when the brake is applied, both of these elements being simultaneously controlled by a treadle which when depressed throws the brake off and switches the current on, while when released, allows a spring to apply the brake and open the switch to cut off the current supply to the motor. The motor circuit also contains a manually operated switch or controller for controlling the speed of the truck and reversing it, the circuit being broken by the controller when its hand lever is moved to its central or neutral position to stop the truck.

To drive the truck, the controller lever must be moved out of neutral position and the treadle depressed and held down until the truck reaches its destination. The moment the operator removes his foot from the treadle it rises automatically, applying the brake and stopping the truck. Under ordinary circumstances,—this automatic stop-provision affords a certain measure of safety. If, however, the operator neglects or forgets to return the controller lever to neutral position and a passerby or other unauthorized person under these conditions depresses the treadle, the motor-circuit will be closed and the truck started, rendering him and others liable to injury. This has happened in railway stations and other places where curious or mischievous persons are apt to tamper with the controlling devices of the truck.

The chief object of this invention is the provision of a safety mechanism which effectively guards against such accidents while the operator is absent from his post.

A further object of the invention is to provide novel, simple and reliable means for automatically returning the controller handle or lever to neutral position when said treadle is released for applying the brake and breaking the motor circuit, so as to insure the complete cutting out of the motor when the operator stops the car and temporarily leaves it.

In the accompanying drawings: Figure 1 is a side elevation of a motor truck embodying my improvements. Fig. 2 is a rear view thereof. Fig. 3 is an enlarged vertical section of the controller box and associated parts, on line 3—3, Fig. 2. Fig. 4 is a horizontal section on line 4—4, Fig. 3. Fig. 5 is a side elevation of the locking quadrant of the controller lever. Fig. 6 is an enlarged sectional elevation of the main switch, the brake and the controller mechanism. Fig. 7 is a horizontal section on line 7—7, Fig. 6. Fig. 8 is an enlarged sectional elevation of the return-mechanism of the controller lever. Fig. 9 is a side elevation of the brake and its controlling mechanism.

Similar characters of reference indicate corresponding parts throughout the several views.

10 indicates the main frame of the truck which may be of any suitable or well known construction, 11 the driving wheels and 12 the usual steering wheels. Mounted on the rear end of the main frame are a pair of standards 13 which serve to support a box 14 for housing a storage battery, not shown, or other source of energy for driving the truck.

15 indicates the usual load-carrying platform and 16 the operator's platform at the rear end thereof.

The wheels 11 are driven by an electric motor 17 which is fastened to the main frame and whose shaft 18 is suitably geared to the axle of said driving wheels, said motor being supplied with current by the storage battery. For changing the speed or reversing the direction of travel of the truck, a controller 19, preferably of the drum type, is provided, which is mounted on the rear wall of the battery-box in convenient reach of the operator. This controller is in circuit with the battery and motor and is manually operable by a vertically-movable controller-lever 20 secured to a short shaft 21 carried by the controller box. Fixed to the inner end of the shaft 21 is a spur gear 22 which meshes with a pinion 23 carried by the horizontal shaft 24 of the controller drum 25, as shown in Figs. 4 and 8.

As before indicated, it has been found expedient in motor trucks of this character to enable the operator to apply the brake and at the same time cut off the current to the motor in order to promptly stop the truck. Any suitable means may be employed for this purpose, but those shown in the drawings by way of example, are constructed as follows:

Mounted on the motor shaft 18 is a brake drum 26 adapted to be engaged by a brake band 27 constructed of two sections hinged at 27$^a$ to the motor frame. The free ends of these sections are provided with ears 28 between which is disposed a rotatable cam-block 29 adapted to expand the band for releasing the brake-drum. This block is secured to a rock shaft 30 which is journaled in a bearing bracket 31 mounted on the motor frame. A coil spring 32 surrounding a bolt 33 which passes through the ears of the brake band serves to normally contract the brake-band about the drum. Operatively connected to the rock shaft 30 is a rock arm 35 which is connected by a link 36 with one arm of a bell crank lever 37 fulcrumed on the motor casing. The other arm of this bell crank is connected by a link 38 with an arm 39 carried by the vertically-movable treadle 40. The latter is secured to a transverse shaft 41 journaled at its ends in the main frame 10, a coil spring 42 connected at one end to the bell crank 37 and at the other end to a portion of said frame serving to normally hold the treadle in its elevated or inoperative position, as shown by full lines in Fig. 6, in which position the brake is set. Pivoted to the treadle adjacent the arm 39 is an upright link 43 whose upper end is connected to one arm of a bell crank lever 44 fulcrumed on the standards 13. The other arm of the lever is connected by a link 45 and a horizontally-movable rod 46 with the movable element of the main motor-circuit switch hereinbefore referred to. In the embodiment shown in the drawings, this movable element consists of a slide 47 connected with the rod 46 to reciprocate therewith and carrying contact fingers 47$^a$ adapted to make electrical connection with the fixed contacts 48 of said switch when the treadle is depressed to its operative position, as shown by dotted lines in Fig. 6. It will be understood from the foregoing that to start the truck, the operator first depresses the treadle to the position just mentioned, which movement releases the brake and at the same time closes said main switch, after which the controller lever is properly shifted to obtain the desired speed. When it is desired to stop the truck, the operator removes his foot from the treadle, permitting the same to ascend under the tension of the spring 42 and automatically applying the brake and simultaneously breaking the motor circuit.

The controller lever 20 may be locked in position by any suitable means. The preferred devices shown in the drawings comprise a segment or quadrant plate 49 mounted on the inner side of the controller box, in spaced relation thereto and provided with a segmental slot 50, one edge of which has an upper set of locking notches 51 and a lower set of locking notches 52, the upper set being for different speeds backward and the lower set for different speeds forward. Adapted to interlock with these notches for retaining the controller lever in its various positions is a pawl or catch 53 carried by said lever and arranged transversely thereof. This pawl is pivoted by a pin 54 in a longitudinal slot 55 of said lever and is operated by a rod 56 passing axially through the controller-lever and pivotally connected at its front end to the free end of the pawl, while its outer end is provided with a push button 57. A coil spring 58 surrounding said rod normally tends to move the pawl into engagement with a notch of the quadrant plate, thereby holding said lever in any desired position.

Means are provided, preferably in conjunction with the switch and brake controlling mechanism for automatically returning the controller lever 20 to neutral position upon the release of the treadle, to avert accidents, in case the operator should neglect or forget to restore the lever to that position. The devices for effecting this return movement are preferably constructed as follows:

Projecting forwardly from the untoothed portion 22$^a$ of the gear 22 is an arm 59 connected by a pin 60 to an upright rod or plunger 61. This rod coöperates with a centering or return spring 62 which is arranged to be compressed when the controller lever is moved out of neutral position in either direction and which therefore tends constantly to return the lever to that position when it is unlocked. Surrounding the lower portion of said plunger is a spring-cage 63 which comprises upper and lower heads 64 provided with central openings 65 for the passage of the plunger, and tie bolts 66 carrying spacing sleeves 67. Loosely guided on this plunger between said upper and lower heads are opposing followers 68 and 69 between which the return-spring 62 is interposed and which are adapted to seat against said heads. Fixed to the plunger above the upper follower 68 is a sleeve or abutment 70 adapted to abut against the latter to compress the spring 62 downwardly when the controller lever 20 is swung above its neutral position; and fixed to the plunger below the lower follower 69 is a similar sleeve 71 adapted to abut against the latter to compress said spring upwardly when the controller lever is lowered below its neutral position.

To permit the necessary oscillating or swiveling movement of the plunger and the spring-cage 63, the lower head 69 of the cage is provided with depending lugs 72 which are pivoted by a transverse pin 73 to a bracket 74 carried by the adjacent standard 13.

To permit of such automatic return movement of the controller lever, provision obviously must be made to automatically disengage the locking catch 53 of the lever from the quadrant plate 49, and to hold the catch in its retracted position while the lever is being returned. This unlocking action of the lever is preferably effected by a releasing device in the form of a vertically-swinging cam-lever 75 which in turn is actuated by the treadle on its upward or releasing stroke. This lever is pivoted at 76 to the outer side of the quadrant plate, and its upper arm is of curved or arcuate form and bears against the front side of the inner arm of the catch 53, so that when said curved arm is swung rearwardly it withdraws the catch from the quadrant plate and blocks its forward movement, while when said arm is swung in the opposite direction, it allows the catch to return into engagement with the quadrant plate. The lower arm of the cam lever is connected with the treadle by a rod 77, a rock lever 78 carried by a transverse shaft 78ª, a rock lever 79, links 79ª and an arm 80 projecting forwardly from the hub of the treadle. This shaft is supported on the standards 13.

It will now be understood that when the treadle is depressed to start the truck, not only is the main switch closed and the brake released, but the baffle or cam lever 75 is at the same time swung out of the way of the locking catch 53 of the controller lever, as shown by dotted lines in Fig. 6, permitting the catch to interlock freely with the quadrant plate after the operator has shifted the controlling lever to the desired position. By this movement of the controller lever the centering spring 62 is compressed, as hereinbefore described.

Should the operator, in stopping the truck, fail to return said lever to neutral position, the upward movement of the released treadle causes the cam-lever to swing to the position shown by full lines in the drawings, thereby withdrawing the catch of the controller lever from the notches of the quadrant plate, releasing said lever and allowing the compressed spring 62 to restore it to neutral position. Under these conditions, the motor circuit is broken at the controller drum 25 and even if the treadle should be depressed by unauthorized persons, the resulting closure of the main switch will not start the motor, averting all danger of accidents. Absolute safety of control is thus attained, inasmuch as it is impossible for any one to start the truck without standing upon the operator's platform, and equally impossible for the operator to release the treadle and leave the truck without at the same time returning the controller lever to a position in which the current-supply is effectually cut off from the motor.

It will be obvious to those skilled in the art, that the invention may be variously modified within the scope of the appended claims without departing from its spirit, and I do not therefore wish to be confined to the particular embodiment herein shown and described.

I claim as my invention:

1. A power-driven truck, comprising a frame, a motor mounted thereon, a controller for the motor having an operating member permanently connected therewith, means for arresting the movement of the truck, and means controlled by said arresting means for moving said operating member to neutral position when the arresting means is moved to operative position.

2. A power-driven truck, comprising a frame, a motor mounted thereon, a controller for the motor having an operating member, means for locking said operating member in operative position, means for arresting the truck, and means controlled by said arresting means for releasing said locking means and moving said operating member to neutral position.

3. A power-driven truck, comprising a frame, a brake for the truck, a treadle for controlling said brake, an electric motor mounted on said frame, an electric controller for said motor having an operating member, means for locking said member in operative position, and means controlled by said treadle for automatically releasing said locking means and returning said operating member to its neutral position when the treadle is moved to brake-applying position.

4. A power-driven truck, comprising a frame, a brake for the truck, an electric motor mounted on said frame, an electric switch included in the circuit of said motor, an electric speed-controller for said motor, means for locking said member in different operative positions, a treadle for controlling said switch and said brake, and means controlled by said treadle for automatically releasing said locking means and moving said speed-controller from its operative to its neutral position when the treadle is moved to brake-applying position.

5. A power-driven truck, comprising a frame, a brake for the truck, an electric motor mounted on said frame, an electric switch for said motor, a speed controller for said motor having an operating member, means for locking said member in operative position, a treadle, and means controlled by said treadle for simultaneously opening said switch, applying said brake and releasing said locking means to shift said operating member to neutral position when the treadle is released.

6. A power-driven truck, comprising a frame, a brake for the truck, a motor mounted on said frame, a speed-controller for said motor having an operating member, yieldable means for resisting movement of said operating member out of its neutral position, retaining means for holding said operating member in different operative positions, a treadle for controlling said brake, and means controlled by said treadle for releasing said retaining means when the treadle is moved to brake-applying position.

7. A power-driven truck, comprising a frame, a brake for the truck, an electric motor mounted on said frame, a speed-controller for said motor having an operating member movable to different operative positions, a notched locking segment, a pawl carried by said operating member and arranged to interlock with said segment, a treadle for controlling said brake, means controlled by the treadle for disengaging said pawl from said segment, and means for automatically returning said operating member to its neutral position when the treadle is moved to brake-applying position.

8. A power-driven truck, comprising a frame, a brake for the truck, an electric motor mounted thereon, a speed controller for said motor having an operating handle, a spring tending to move said handle to neutral position, means for locking said handle in different operative positions, means for controlling said brake, and means under control of said brake-controlling means for releasing said handle-locking means.

9. A power-driven truck, comprising a frame, a brake for the truck, an electric motor mounted on said frame, a controller for regulating the speed of said motor, a spring-actuated handle for said controller, a quadrant plate provided with a series of notches corresponding to different speeds, a pawl carried by the controller handle and arranged to engage one or another of said notches, a cam-member for holding the pawl out of engagement with said notches, and means for simultaneously controlling said brake and actuating said cam member.

10. A power-driven truck, comprising a frame, a brake for the truck, an electric motor mounted on said frame, a controller for regulating the speed of said motor, a spring-actuated handle for said controller, a quadrant plate provided with a series of notches corresponding to different speeds, a pawl carried by the controller handle and arranged to engage one or another of said notches, a cam lever having a curved arm arranged to move said pawl out of engagement with said notched quadrant and hold it in that position, and means for controlling said brake and actuating said cam lever.

11. A power-driven truck, comprising a frame, a motor mounted on said frame, a controller having a drum for regulating the speed of said motor, said drum having an actuating pinion, a shaft carrying an operating handle and a gear meshing with said pinion, an arm mounted directly on said shaft, and spring controlled means connected to said arm for normally holding said handle in neutral position.

12. A power-driven truck, comprising a frame, a motor mounted thereon, a controller having a drum for regulating the speed of said motor, an operating handle for said controller, a notched quadrant plate, a pawl carried by the controller handle and arranged to engage said notched quadrant, a cam member for moving and holding said pawl out of engagement with the quadrant, means for controlling said cam member, a pinion for rotating the drum of said controller, a shaft carrying said controller-handle and a gear meshing with said pinion, an arm connected with said shaft, and spring-controlled means connected to said arm for returning said controller handle to neutral position upon the withdrawal of said pawl by said cam member.

13. A power-driven truck, comprising a frame, an electric motor mounted thereon, a controller for the motor having an operating member, means for locking said member in different positions, means for releasing said locking means, and mechanism for moving said operating member to and holding it in neutral position, comprising a spring-cage having heads at opposite ends, a plunger passing through said heads, followers within the cage arranged to abut against said heads, a spring interposed between said followers, and abutments secured to said plunger outside of the cage and arranged to engage said followers, respectively.

14. A power-driven truck, comprising a frame, a motor mounted thereon, a brake for the truck, a treadle for controlling the brake, a speed controller for said motor having an operating handle, means for locking said handle in different positions, means controlled by said treadle for releasing said handle, means for returning said handle to neutral position, when released, comprising a plunger, a spring-cage pivotally mounted on said frame and having heads through which said plunger passes, followers mounted on the plunger within the cage, a spring surrounding the plunger between said followers, abutments fixed on said rod and arranged to engage said followers, respectively, a treadle, and connections between said treadle and said brake for simultaneously controlling said elements.

WILLIAM C. CARR.